United States Patent
McGee et al.

(10) Patent No.: US 9,970,710 B2
(45) Date of Patent: May 15, 2018

(54) CARBON BAKING HEAT RECOVERY RING FURNACE

(71) Applicant: Fluor Technologies Corporation, Sugar Land, TX (US)

(72) Inventors: Mike McGee, Greer, SC (US); Tom Haines, Evansville, IN (US); Kenneth Meyer, Mt. Pleasant, SC (US); Steve Hillock, Greenville, SC (US)

(73) Assignee: Fluor Technologies Corporation, Sugar Land, TX (US)

( * ) Notice: Subject to any disclaimer, the term of this patent is extended or adjusted under 35 U.S.C. 154(b) by 1203 days.

(21) Appl. No.: 13/794,448

(22) Filed: Mar. 11, 2013

(65) Prior Publication Data

US 2013/0337391 A1   Dec. 19, 2013

Related U.S. Application Data

(60) Provisional application No. 61/660,452, filed on Jun. 15, 2012.

(51) Int. Cl.
| | |
|---|---|
| F27B 13/14 | (2006.01) |
| F27B 13/06 | (2006.01) |
| F27D 17/00 | (2006.01) |

(52) U.S. Cl.
CPC ........... F27B 13/14 (2013.01); F27B 13/06 (2013.01); F27D 17/00 (2013.01); Y02P 10/265 (2015.11); Y02P 10/283 (2015.11)

(58) Field of Classification Search
CPC .......... F27B 13/00; F27B 13/02; F27B 13/04; F27B 13/06; F27B 13/12

USPC ................................................. 432/176, 192
See application file for complete search history.

(56) References Cited

U.S. PATENT DOCUMENTS

| | | | | |
|---|---|---|---|---|
| 3,852,026 | A | * | 12/1974 | Johansson ........................ 432/23 |
| 3,941,557 | A | * | 3/1976 | Buchner ........................ 432/17 |
| 4,128,394 | A | | 12/1978 | Naito et al. |
| 4,253,823 | A | | 3/1981 | Holdner |
| 4,767,320 | A | * | 8/1988 | Sasaki ........................ F27B 9/40 |
| | | | | 432/152 |
| 5,473,628 | A | | 12/1995 | Tokvam et al. |
| 5,682,631 | A | | 11/1997 | Weismiller et al. |
| 6,436,335 | B1 | | 8/2002 | Leisenberg |
| 2010/0209863 | A1 | | 8/2010 | Jonville |

(Continued)

FOREIGN PATENT DOCUMENTS

| | | |
|---|---|---|
| EP | 0541165 | 11/1992 |
| GB | 116455 | 6/1918 |
| GB | 948038 | 1/1964 |

(Continued)

OTHER PUBLICATIONS

Europe Patent Application No. 13804760.0, Examination Report, dated Nov. 24, 2016, 6 pages.

(Continued)

*Primary Examiner* — Steven B McAllister
*Assistant Examiner* — Ko-Wei Lin
(74) *Attorney, Agent, or Firm* — Conley Rose, P.C.

(57) ABSTRACT

Contemplated devices and methods reduce heat loss and energy demand of a carbon baking ring furnace by employing a preferably internal bypass conduit that feeds a portion of a heated cooling air stream from the cooling zone directly to the flue ducts of the firing and/or pre-heat zones.

20 Claims, 3 Drawing Sheets

(56) References Cited

U.S. PATENT DOCUMENTS

2011/0017423 A1* 1/2011 Leisenberg .................. 165/47

FOREIGN PATENT DOCUMENTS

| WO | 91/19147 | 12/1991 |
|---|---|---|
| WO | 2004/027332 | 4/2004 |

OTHER PUBLICATIONS

Europe Patent Application No. 13804760.0, Extended European Search Report, dated Dec. 23, 2015, 9 pages.
PCT Application No. PCT/US2013/030282, International Search Report, dated Jun. 4, 2013, 3 pages.
PCT Application No. PCT/US2013/030282, Written Opinion, dated Jun. 4, 2013, 9 pages.
PCT Application No. PCT/US2013/030282, International Report on Preliminary Patentability, dated Dec. 16, 2014, 10 pages.

* cited by examiner

CARBON BAKING HEAT RECOVERY RING FURNACE

This application claims the benefit of priority to U.S. provisional application having Ser. No. 61/660,452, filed on Jun. 15, 2012.

FIELD OF THE INVENTION

The field of the invention is devices and methods for heat recovery in furnaces, and especially in ring furnaces for carbon baking operations.

BACKGROUND

Carbon baking furnaces, and particularly ring furnaces, are often used in the manufacture of carbon anodes for the aluminum smelting processes. Due to the high temperatures and long baking times, anode baking requires substantial quantities of energy and has become a significant contributor to production cost. Moreover, due to the often relatively low oxygen content in the furnace, pitch is not completely combusted and tends to lead to fires, variations in operating conditions, and maintenance issues for downstream scrubber systems.

Numerous ring furnaces for carbon baking and methods of operating same are known in the art, and exemplary devices and methods are described, for example, in WO 02/099350, U.S. Pat. Nos. 4,215,982, 4,284,404, and 6,339,729, GB 116455, EP 0 541 165, and WO 9855426A1. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

To improve operations, it is known to implement computer control for the firing rates for burners as disclosed in U.S. Pat. No. 6,436,335. However, such control is typically not suitable to remedy incomplete combustion due to lack of oxygen. Moreover, increase of fuel delivery to the furnace will in such systems in all or almost all circumstances not lead to a more complete combustion of volatiles and pitch. As an alternative to burner control, U.S. Pat. No. 4,253,823 teaches use of a water spray/vapor to increase heat transfer between the cooling gas and baked carbon electrodes. While such approach may indeed help reduce fuel demand, other difficulties may arise, including problems associated with downstream condensation and undesirable side-reactions.

In still other known methods, attempts have been undertaken to introduce supplementary air to the preheating zone of a ring furnace to so reduce incomplete combustion of pitch and other undesirable side products as, for example, described in WO 91/19147. Such approach may conceptually be attractive, however, suffers from various drawbacks in practice. For example, where the supplemental air enters the flue in the preheating zone by way of a valve using the negative pressure in the preheating zone flue, the zero point may move in the furnace towards the firing zone. To help overcome this disadvantage, the draft rate at the preheating zone may be increased. However, such increase may adversely affect the temperature gradient in the preheating zone and may not yield desirable heating performance. Still further, the energy gain by introduction of supplemental air for increased combustion will be in most cases neutralized by a temperature drop caused by the addition of supplemental air. Similarly, WO 2004/027332 describes near real-time measurement of soot in the furnace and adjusts the fuel feed rate, draft fan rate, and/or secondary air feed through openings in the zones of the furnace in response to the measured soot level. Notably, the '332 application recognizes the drawbacks of secondary air feed and teaches that secondary air feeds are undesirable and that proper furnace design should eliminate the need for secondary air feeds.

In yet another known attempt to improve energy efficiency, EP 0 158 387 teaches heating of carbon materials in a first pre-heating stage up by use of hot combusted volatile matter, which is obtained by withdrawing the released volatile matter from the first stage, burning the volatile matter outside the first stage, and by recycling the burnt volatile matter to the first stage. Such configuration advantageously improves the pre-heating. Nevertheless, considerable amounts of energy are still required for the firing zone of the furnace. Similarly, GB 948038 discloses a baking furnace with a refractory floor and vertical metal flues to so adapt to baking of carbonaceous bodies of widely different sizes and shapes under conditions of increased thermal efficiency, increased unit capacity, reduced furnace construction and operational costs. Among other configurations, the furnace of the '038 reference is configured to allow feeding of the exhaust gas after leaving the furnace back to the combustion source. However, such feedback is typically not suitable for a ring furnace.

Thus, even though numerous configurations and methods for carbon baking furnaces are known in the art, there is still a need for more energy efficient furnaces.

SUMMARY OF THE INVENTION

The inventive subject matter is drawn to various devices and methods of reduction of loss of heat and energy consumption in a furnace, and most typically in a ring furnace, in which a bypass conduit is provided that allows feeding of a portion of a heated cooling air stream to the firing and/or pre-heat zones, which will not only assist in complete combustion of the fuel and/or volatiles, but also provide supplemental heat to the firing and/or pre-heat zones.

In one aspect of the inventive subject matter, a carbon baking heat recovery ring furnace has a plurality of wall elements, each having an internal flue channel, wherein the plurality of wall elements are fluidly coupled to each other such that the internal flue channels form a continuous flow path having, in sequence, a pre-heat zone, a firing zone, and a cooling zone. A bypass conduit is fluidly coupled to the flue channel of the cooling zone and the flue channel of the firing zone and/or pre-heal zone such that a portion of a heated cooling air stream in the flue channel of the cooling zone is directly (i.e., not via a burner) delivered to the firing zone and/or the pre-heat zone. A plurality of gates is coupled to the bypass conduit, and the gates and the bypass conduit are configured to allow flow of the portion of the heated cooling air stream without substantially moving a zero point in the ring furnace (i.e., movement of the zero point is within a single section/wall element of a zone).

While in some aspects of the inventive subject matter the bypass conduit is formed within a wall section of the plurality of wall elements, a portion of the bypass conduit may also be external to the plurality of wall elements. It is further generally preferred that the gates are configured to allow delivery of the heated cooling air stream into multiple and distinct wall elements of the firing and/or pre-heat zone. Moreover, it is further contemplated that a control system is included to automatically operate the gates such that the position of the bypass conduit changes as the firing frame is moved in firing direction. However, manual operation is also deemed suitable.

It is further generally preferred that the bypass conduit and the gates are configured to deliver the portion of the heated cooling air stream to a position downstream of a first firing frame in the firing zone, or to a position at or downstream of a terminal firing frame in the firing zone. While not limiting to the inventive subject matter, the portion of the heated cooling air stream is typically between 5% and 35% of the heated cooling air stream. Furthermore, it is generally preferred that the bypass conduit and the gates are configured to deliver the portion of the heated cooling air stream to the firing zone and/or pre-heat zone at about the operating pressure present in the cooling zone. The term "about" in conjunction with a numerical value or parameter as used herein refers to a range of +/−10%, inclusive, of the numerical or parameter. For example, if the operating pressure in the preheat zone is about 80 kPa, the term about 80 kPa refers to a range of 72-88 kPa.

Therefore, the inventors also contemplate a method of reducing energy consumption of a ring furnace (constructed from a plurality of wall elements (also known as sections), each having an internal flue channel, wherein the plurality of wall elements are fluidly coupled to each other such that the internal flue channels form a continuous flow path to form, in sequence, a pre-heat zone, a firing zone, and a cooling zone) in which in one step a plurality of gates are opened to thereby configure a bypass conduit such that a portion of a heated cooling air stream in the flue channel of the cooling zone is directly (preferably not via a burner) delivered to the firing zone and/or the pre-heat zone. In especially preferred methods, the bypass conduit and the plurality of gates are configured such as to allow delivery of the portion of the heated cooling air stream to the firing zone and/or the pre-heat zone at about an operating pressure present in the cooling zone and without substantially moving a zero point in the ring furnace.

In further contemplated aspects of such methods, it is generally preferred that the gates are coupled to the plurality of wall elements, and that the bypass conduit is formed within a wall section of the plurality of wall elements. Alternatively, at least a portion of the bypass conduit also be external to the plurality of wall elements. While not limiting to the inventive subject matter, it is preferred that the portion of the heated cooling air stream has a temperature of at least 1000° C., and/or that the portion of the heated cooling air stream is between 5% and 35% of the heated cooling air stream. As noted before, it is contemplated that the portion of the heated cooling air stream is delivered to a position at or downstream of a terminal firing frame in the firing zone.

Therefore, and viewed from yet another perspective, the inventors contemplate a method of reducing energy consumption of a ring furnace having a pre-heat zone, a firing zone, and a cooling zone, in which heat energy from the cooling zone is recycled directly to the pre-heat zone and/or firing zone, and wherein the heat energy is carried from the cooling zone to the pre-heat zone and/or firing zone by a portion of a heated cooling air stream flowing through cooling zone.

Most typically, the step of recycling is performed using a configurable conduit that is formed in or runs though a plurality of wall elements that make up the pre-heat zone, the firing zone, and the cooling zone, and/or the portion of the heated cooling air stream is delivered at about operating pressure of the cooling zone. While not limiting to the inventive subject matter, it is preferred that the portion of the heated cooling air stream is between 5% and 35% of the heated cooling air stream.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

Prior art

Prior art

DETAILED DESCRIPTION

The inventors have discovered that a carbon baking ring furnace can be equipped with a preferably internal bypass conduit to recycle waste heat from the cooling section directly to the internal flue channel of the pre-heat zone and/or a firing zone. Such bypass advantageously also increases the oxygen content and so assists in complete combustion of pitch and volatiles even at reduced fuel consumption. Heat recovery firing systems for carbon baking furnaces according to the inventive subject matter are estimated to reduce fuel, and especially natural gas consumption by at least 10%, more typically at least 25%, and more typically 25% to 40%, and even higher. Moreover, due to the substantially complete combustion of pitch and volatiles, inadvertent fires and maintenance cost of downstream scrubber systems are significantly reduced.

Of course, it should be appreciated that the zones as referred to herein are not positionally fixed zones, but (typically identically configured) zones that are operated as pre-heating, firing, and cooling zones as a function of the position of the cooling manifold, firing frame, and exhaust manifold. Moreover, it should be noted that each of the pre-heating, firing, and cooling zones will have a plurality of sections. Thus, in most typical embodiments, each zone and/or section will comprise a plurality of wall elements, each having an internal flue channel, wherein the plurality of wall elements are fluidly coupled to each other such that the internal flue channels form a continuous flow path to form, in sequence, the pre-heat zone, the firing zone, and the cooling zone. A firing unit is then operationally coupled to at least one wall element (of a single section or zone) and configured to provide fuel (e.g., natural gas, syngas, or other hydrocarbon fuel) to the firing zone, while the cooling and exhaust manifolds are positioned appropriately upstream and downstream of the firing unit.

Figure 1:
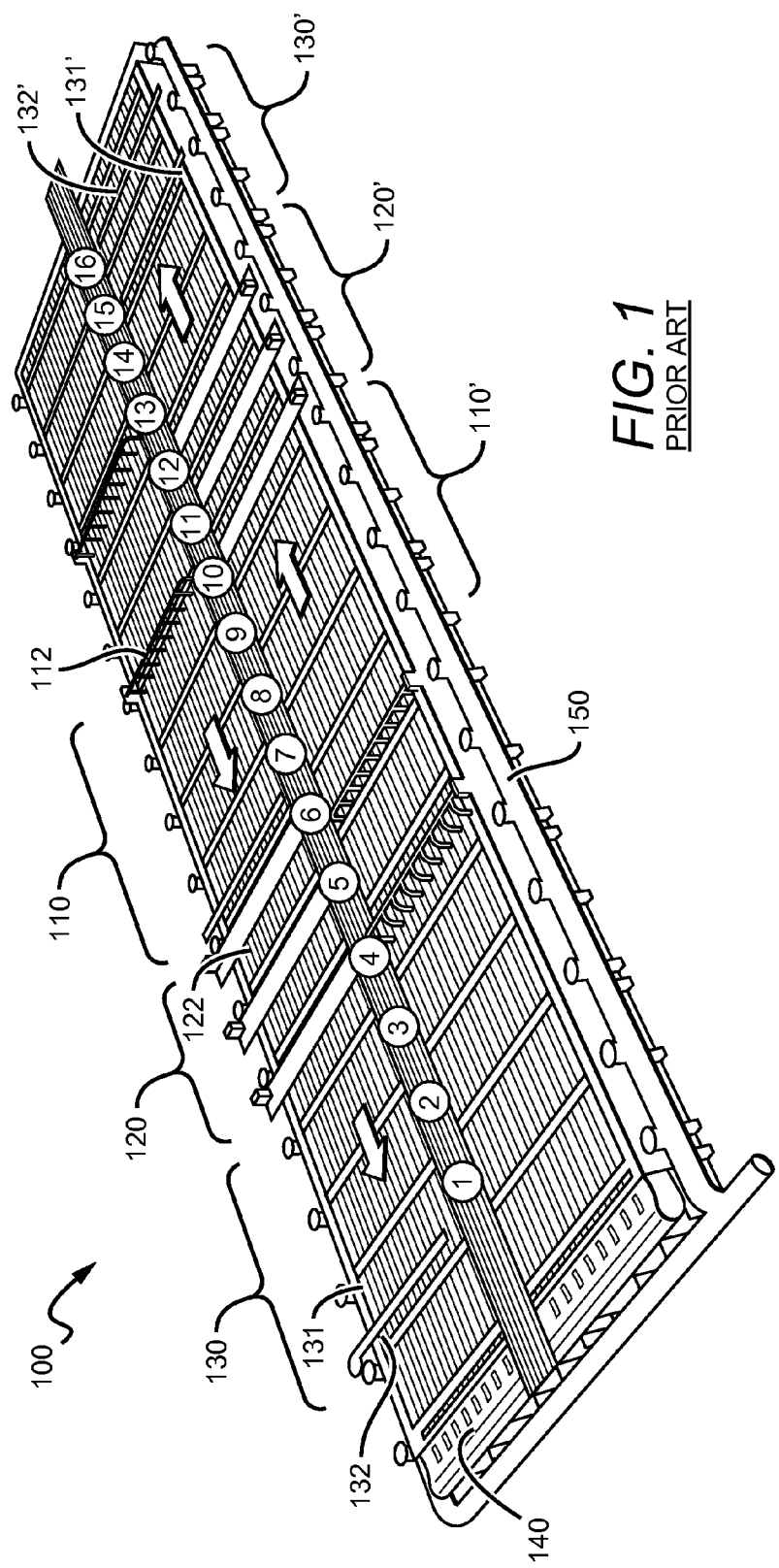
FIG. 1 is a schematic of an exemplary ring furnace for baking carbon anodes.

Prior art FIG. 1 schematically illustrates an exemplary ring furnace 100 having two parallel trains of sections (e.g., 1-16) that are fluidly coupled by a crossover to form a ring furnace (it should be noted that the preheat, firing, and cooling zones rotate around the furnace). As the firing zone advances, anodes are removed and added in sections in advance of the firing zone to so allow continuous operation of the furnace runs. In the bake furnace 100 of Prior Art FIG. 1, there are two firing zones 120 moving in counter clockwise direction with each advance. An advance increments the process one section at a time around the furnace. The firing frame 122 (only one labeled), draft frames 131 and 131', preheat zones 130, cooling zones 110, preheat (exhaust) manifold 132, and cooling manifold 112 advance around the ring furnace with the firing zones. Stationary parts of the furnace are the crossover 140 and common collection exhaust side main 150 as well as the sections, flues, and walls. Each train has a pre-heating zone 130 and 130' with a firing zone 120 and 120', one or more firing frames 122 (only one is labeled), and cooling zone 110 and 110', respectively. Crossover 140 connects the trains and exhaust gas from preheat (exhaust) manifolds 132 and 132' is delivered to common exhaust collection conduit 150. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Of course, it should be recognized that the particular number of wall elements in the preheat, firing, and cooling zones can vary considerably and will generally depend on furnace design and operation.

Figure 2:
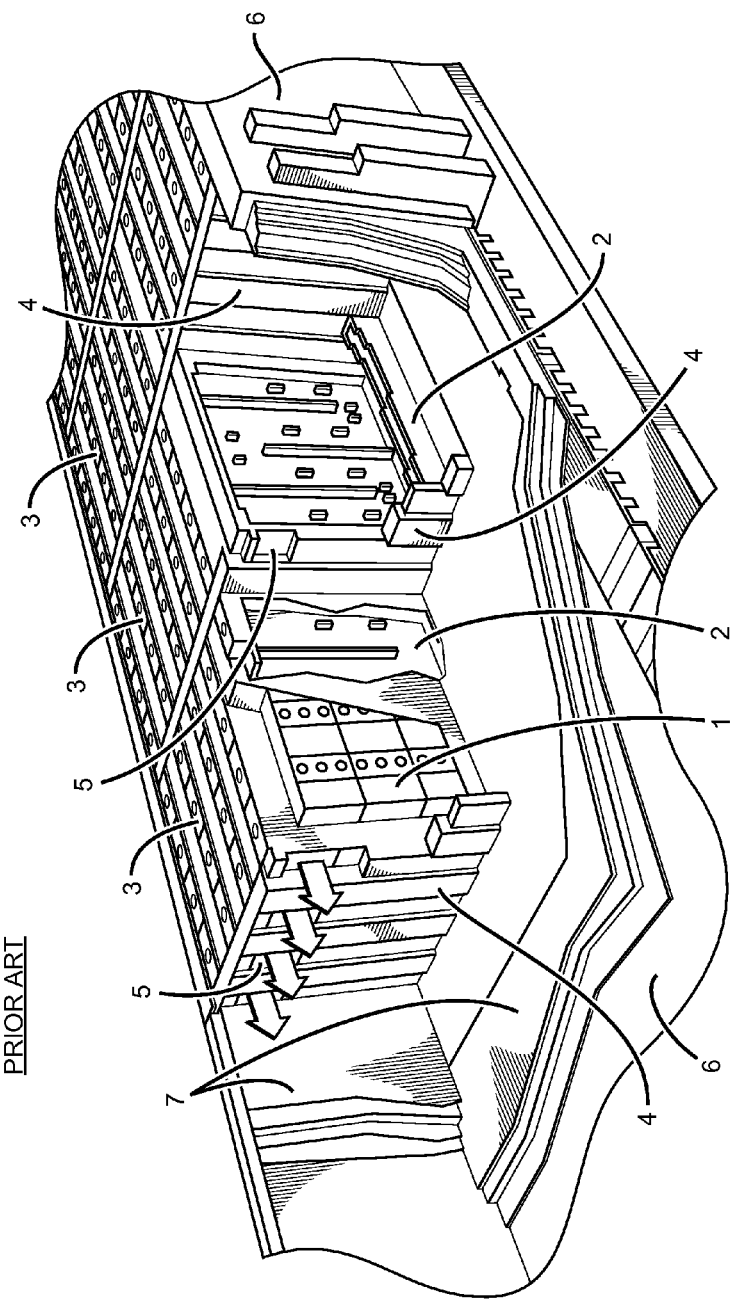
FIG. 2 is a partial cut-away view of the exemplary ring furnace of FIG. 1.

Prior art FIG. 2 provides a more detailed schematic view of the sections in the furnace. Here, numeral 1 depicts within the pit that is formed by two adjacent wall elements anodes (in light grey) and packing coke (in dark grey). The wall elements 2 include an internal flue channel within which the combustion gases move from one wall element/zone to another via fluid coupling through openings (at 5) in the headwall 4 of the wall elements. Circulation of the hot gases is schematically indicated with the numeral 5. As is readily apparent from this illustration, multiple wall elements 2 form multiple pits of a single section 3 within a zone and help convey heated gases from one section to another and one zone to another. The sections and flues are typically contained within a concrete tub 6 that is tined with thermal insulation 7. Movement of the draft frame, the firing frames, the exhaust manifold, and cooling manifold is typically manually performed or in an at least partially automated manner. Fire control is performed in either semi automated or fully automated manner using a computer to control the process (not shown).

Figure 3:
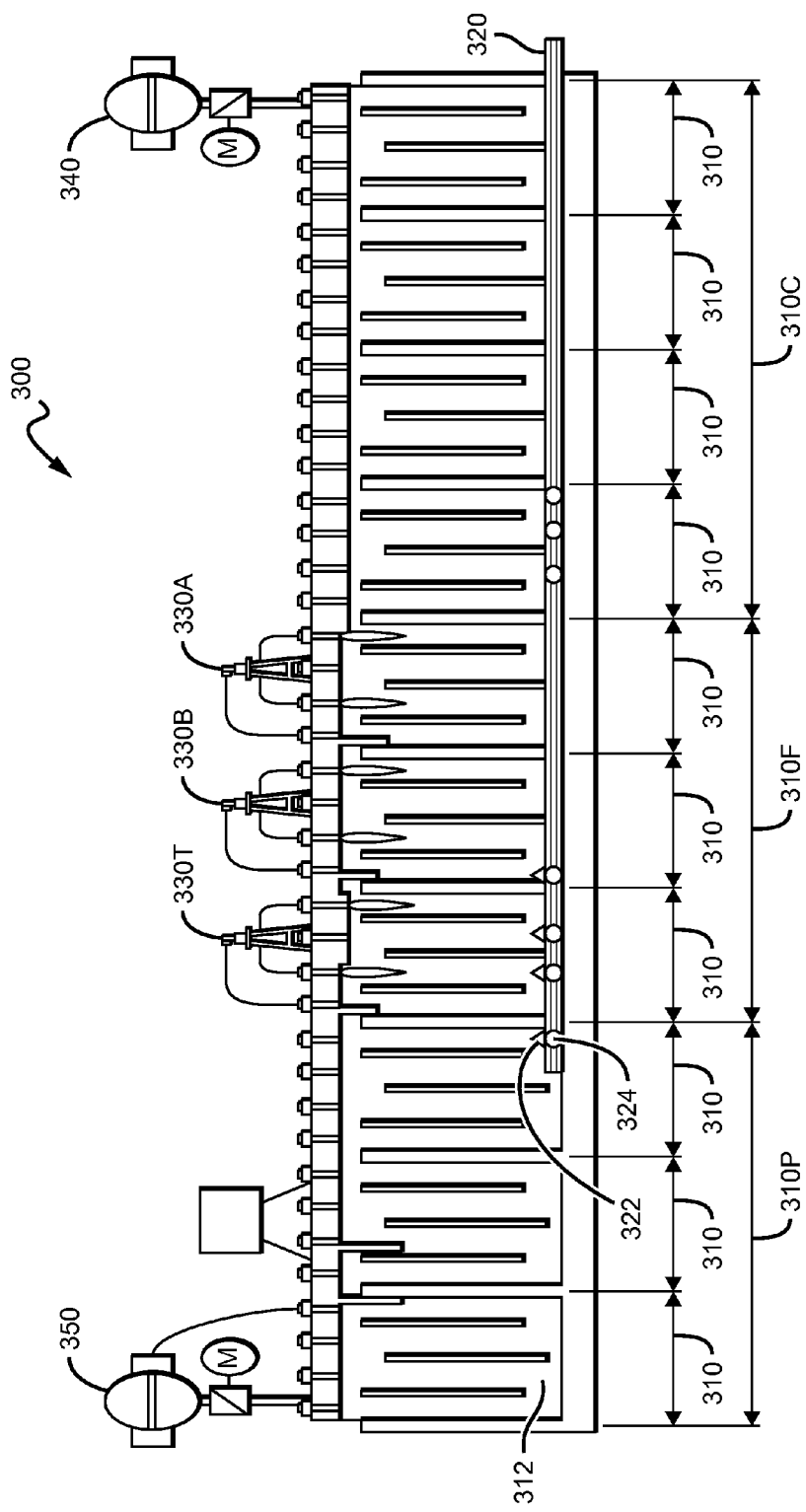
FIG. 3 is a schematic illustration of a ring furnace according to the inventive subject matter.

The inventors have now discovered that an additional bypass conduit can be implemented in existing or new carbon baking furnaces in a conceptually simple and effective manner to so reduce fuel demand and increase combustion of pitch and volatiles. FIG. 3 exemplarily shows a schematic of a carbon baking heat recovery ring furnace 300 according to the inventive subject matter. The furnace comprises a number of wall elements 310, each having an internal flue channel 312. The wall elements are then fluidly coupled to each other such that the internal flue channels form a continuous flow path as illustrated in Prior Art FIG. 2. As a consequence, and as a function of placement of the firing frame and cooling/exhaust manifolds the continuous path forms in sequence, a pre-heat zone 310P, a firing zone 310F having first, second, and terminal firing frames 330A, 330B, and 330T, respectively, and a cooling zone 310C. In the example of FIG. 3, the preheat zone 310P comprises three distinct sections that are fluidly and thermally coupled to each other. The temperature of these sections (from left to right) is typically 200-600° C., 600-850° C., and 850-1050° C., respectively, while the firing zone 310F has three sections with temperatures of about 1050-1200° C. in each zone. Next to the firing zone is a cooling zone 310C that includes four sections with decreasing temperatures of 1050-1200° C., 1075-1150° C., 900-1075° C., and 800-900° C., respectively. Of course, it should be appreciated that the exact number of sections may vary considerably.

A bypass conduit 320 is in direct heat exchange with the hot cooling air flowing through the internal flue channel and has a plurality of gates 322 (not all gates shown) to so allow fluidly coupling of the flue channel of the cooling zone with the flue channel of the firing zone and/or pre-heat zone. Thus, a portion of heated cooling air stream flowing in the flue channel of the cooling zone can be directly delivered to the firing and/or pre-heat zone. Most typically, the gates fluidly are placed in the bypass conduit such that each of the wall elements can provide or receive air from the bypass conduit in at least one position. Thus, by opening or closing the appropriate gates, a bypass conduit can be configured that will receive heated cooling air from the flue channel in at least one wall element of the cooling zone and that will deliver the heated cooling air to the flue channel of at least one other wall element in the firing zone and/or preheat zone. Most preferably, the bypass conduit and/or the gates are configured (or operable) such as to allow flow of a portion of the heated cooling air stream without substantially moving the zero point 302 in the ring furnace during firing operation.

In this context, it should be noted that the cooling manifold 340 is coupled to a blower, booster, or other fan to so deliver ambient air to the internal flue channel, most typically via a cooling manifold. Thus, the pressure at the delivery point of the ambient air to the internal flue channel is relatively high and decreases as the air flows through the tortuous path within the wall elements of the cooling zone. On the other end, an exhaust manifold 350 is coupled to a draft fan or other device (and draft frame 360) to so produce a negative pressure in the pre-heating zone and firing zone. The zero point 302 is thus the location at which the pressure is at about ambient pressure. It should be noted that movement of the zero point during firing operation from such position may adversely affect operation. For example, if the zero point moves into the firing zone, serious difficulties may arise due to the positive pressure at the fuel injection site. On the other hand, if the zero point substantially moves into the cooling zone, preheating and cooling may be adversely affected.

Remarkably, the inventors have discovered that a bypass conduit can be implemented that allows delivery of sufficient quantities of a heated cooling air stream from the positive pressure environment of the cooling zone directly to the negative pressure environment of the internal flue channels of the firing and/or preheat zone to reduce fuel gas consumption and increase combustion efficiency without substantially moving the zero point during firing operation. Most typically, the zero point will remain during firing operation within the same wall element, and even within the same location within the same wall element. As will be readily appreciated, the quantity of the bypass stream (i.e., the portion of the heated cooling air stream flowing through the bypass conduit) can be regulated via the gates (and optional baffles), as well as through the diameter of the bypass conduit. Most typically, however, the portion of the heated cooling air stream flowing through the bypass conduit will be between about 5-15 vol %, more typically between 5-25 vol %, even more typically between 15-35 vol %, and most typically between about 20-40 vol %.

Moreover, it should be appreciated that temperature control can be significantly fine tuned by use of proper selection and degree of opening of the gates. For example, where high temperature recycling is desired, the gates closest to (but not in) the firing zone will be opened. On the other hand, where less heat is required, a mixture of heated cooling air can be withdrawn from different wall elements in the cooling section, or from wall elements more distant from the firing section. Similarly, it should be recognized that the site of delivery of the heated cooling air may vary considerably, and that the choice is primarily dictated by the particular process and materials in the furnace. Thus, delivery is contemplated to the firing zone as well as to the preheat zone, or both. However, in especially preferred aspects of the inventive subject matter, the bypass stream is delivered to a position downstream of a first firing frame in the firing zone, and even more typically at or at or downstream of a terminal firing frame in the firing zone.

Thus, it should be recognized that the bypass stream effectively provides recovered waste heat to the firing zone and/or preheat zone in an amount effective to reduce fuel demand, which allows oxygen otherwise used in the combustion of fuel now to participate in the combustion of the pitch and volatiles. Moreover, and depending on the particular location of the air being drawn into the bypass conduit, the bypass stream will also provide additional oxygen to the firing zone and/or preheat zone thus further assisting in the combustion processes. Most typically, the bypass conduit is configured/fluidly coupled to a section of the cooling zone where the heated cooling air has a temperature of between 1150-1200° C., 1100-1150° C., 1050-1100° C., 1000-1050° C., 950-1000° C., 900-950° C., and/or 800-900° C.

It should therefore be appreciated that the control over the gates on the bypass conduit may be used not only for temperature control, but also for combustion control, and control of the preheating temperatures or temperature gradient. Additionally, the gates and bypass conduit may also be used to maintain or change a pressure gradient in the ring furnace, and to control the location of the zero point where significant quantities of a bypass stream are being used. Most typically, control of the gates is performed in an automated or semi-automated fashion using a control circuit for opening and/or closing the gates. For example, automated or semi-automated operation is preferred when the firing frame and manifolds are being moved. However, manual operation is also deemed suitable for use herein.

It should still further be appreciated that the gates can also be operated such that multiple individual and fluidly separate bypass conduits can be configured and operated within the same furnace. For example, auxiliary bypass conduits may be generated by actuating the gates such that a desired heat distribution and/or temperature or pressure gradient can be achieved within a single zone (e.g., within the firing zone and/or preheat zone). Moreover and where desired, one or more pressure control devices may be coupled to the bypass conduit and/or gates to so allow moving a bypass stream in a desired direction and/or at a desired rate. For example, the direction may be opposite to the direction of the flue gas moving through the internal channel and the rate may be higher or lower than the flow rate of the flue gas moving through the internal channel.

With respects to the bypass conduit it is generally preferred that the bypass conduit is an internal conduit. For example, the conduit may be formed as an integral part of a wall element, or may be added to the wall element, and may be at least partially disposed within the flue channel of the wall elements. Alternatively, the bypass conduit may also be at least in part external to the wall element. In such case, it is generally preferred that the conduit is located in, at, or near the sides or even bottom of the wall elements, and that the conduit will be covered by insulating material normally covering the wall elements. In less preferred aspects, a heat transfer solution (e.g., molten salt solution, oils, etc.) may be used for heating the bypass stream. In still further contemplated aspects, more than one bypass conduit may be provided or formed to allow for even more process control.

Consequently, a method of reducing energy consumption of a ring furnace will include a step of operating a plurality of gates to configure a bypass conduit such that a portion of a heated cooling air stream in the flue channel of the cooling zone is directly delivered (rather than via a burner or firing frame) to the firing zone and/or pre-heat zone. As already noted above, it is generally preferred that the bypass conduit and the gates are configured such as to allow delivery of the portion of the heated cooling air stream to the firing zone and/or pre-heat zone at about an operating pressure present in the cooling zone and without substantially moving a zero point in the ring furnace. With respect to the ring furnace, the gates, the bypass conduit, and other components used in this method, the same considerations as provided above apply and are not reiterated here.

Therefore, and viewed form yet another perspective, it is contemplated that a method of reducing energy consumption of a ring furnace (having a pre-heat, firing, and cooling zone) will include a step of recycling heat energy from the cooling zone directly to the pre-heat zone and/or firing zone, wherein the heat energy is carried from the coating zone to the pre-heat zone and/or firing zone by a portion of a heated cooling air stream flowing through cooling zone. Once more, and as already addressed above, it is generally preferred that a configurable recycling conduit is formed in or runs though a plurality of wall elements that make up the pre-heat zone, the firing zone, and the cooling zone, and that opening and/or closing of gates coupled to the conduit and the wall sections in the selected zones will so produce a bypass conduit that is operable throughout the entire furnace. Alternatively, in less preferred aspects, a bypass conduit may be preformed and coupled to the desirable sections.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A carbon baking heat recovery ring furnace, comprising:
   a plurality of wall elements, each having an internal flue channel, wherein the plurality of wall elements are fluidly coupled to each other such that the internal flue channels form a continuous flow path having, in sequence, a pre-heat zone, a firing zone, and a cooling zone;
   a bypass conduit fluidly coupled to the flue channel of the cooling zone and the flue channel of the firing zone and the pre-heat zone such that a portion of a heated cooling air stream in the flue channel of the cooling zone is directly delivered to at least one of the firing zone and the pre-heat zone; and a plurality of gates coupled to the bypass conduit, wherein the plurality of gates and the bypass conduit are configured to allow flow of the portion of the heated cooling air stream without substantially moving a zero point in the ring furnace.

2. The carbon baking heat recovery ring furnace of claim 1 wherein the bypass conduit is formed within a wall section of the plurality of wall elements.

3. The carbon baking heat recovery ring furnace of claim 1 wherein a portion of the bypass conduit is external to the plurality of wall elements.

4. The carbon baking heat recovery ring furnace of claim 1 wherein the plurality of gates are configured to allow delivery of the heated cooling air stream into multiple and distinct wall elements of the at least one of the firing zone and the pre-heat zone.

5. The carbon baking heat recovery ring furnace of claim 1 further comprising a control system that is configured to automatically operate the plurality of gates such that a position of the bypass conduit changes as a firing frame is moved in firing direction.

6. The carbon baking heat recovery ring furnace of claim 1 wherein the bypass conduit and the plurality of gates are configured to deliver the portion of the heated cooling air stream to a position downstream of a first firing frame in the firing zone.

7. The carbon baking heat recovery ring furnace of claim 1 wherein the bypass conduit and the plurality of gates are configured to deliver the portion of the heated cooling air stream to a position at or downstream of a terminal firing frame in the firing zone.

8. The carbon baking heat recovery ring furnace of claim 1 wherein gates and the bypass conduit are configured such that the portion of the heated cooling air stream is between 5% and 35% of the heated cooling air stream.

9. The carbon baking heat recovery ring furnace of claim 1 wherein the bypass conduit and the plurality of gates are configured to allow delivery of the portion of the heated cooling air stream to the at least one of the firing zone and the pre-heat zone at about an operating pressure present in the cooling zone.

10. A method of reducing energy consumption of a ring furnace having a plurality of wall elements, each having an internal flue channel, wherein the plurality of wall elements are fluidly coupled to each other such that the internal flue channels form a continuous flow path to form, in sequence, a pre-heat zone, a firing zone, and a cooling zone, the method comprising:

operating a plurality of gates to configure a bypass conduit such that a portion of a heated cooling air stream in the flue channel of the cooling zone is directly delivered to at least one of the firing zone and the pre-heat zone; and wherein the bypass conduit and the plurality of gates are fluidly coupled to the firing zone and the pre-heat zone, and configured so as to allow delivery of the portion of the heated cooling air stream to at least one of the firing zone and the pre-heat zone at about an operating pressure present in the cooling zone and without substantially moving a zero point in the ring furnace.

11. The method of claim 10 wherein the bypass conduit is formed within a wall section of the plurality of wall elements.

12. The method of claim 10 wherein the portion of the heated cooling air stream has a temperature of at least 1000° C.

13. The method of claim 10 wherein the portion of the heated cooling air stream is between 5% and 35% of the heated cooling air stream.

14. The method of claim 10 wherein the portion of the heated cooling air stream is delivered to a position at or downstream of a terminal firing frame in the firing zone.

15. The method of claim 10 wherein at least a portion of the bypass conduit is external to the plurality of wall elements.

16. The method of claim 10 wherein the portion of the heated cooling air stream is delivered to the firing zone and the pre-heat zone.

17. A method of reducing energy consumption of a ring furnace having a pre-heat zone, a firing zone, and a cooling zone, comprising:

recycling, via a configurable conduit, heat energy from the cooling zone directly to at least one of the pre-heat zone and the firing zone, wherein the heat energy is carried from the cooling zone to the at least one of the pre-heat zone and the firing zone by a portion of a heated cooling air stream flowing through cooling zone without substantially moving a zero point in the ring furnace; and wherein the configurable conduit is coupled to the pre-heat zone, the firing zone, and the cooling zone.

18. The method of claim 17 wherein the configurable conduit that is formed in or runs through a plurality of wall elements that make up the pre-heat zone, the firing zone, and the cooling zone.

19. The method of claim 17 wherein the portion of the heated cooling air stream is delivered at about an operating pressure present in the cooling zone.

20. The method of claim 17 wherein the portion of the heated cooling air stream is between 5% and 35% of the heated cooling air stream.

* * * * *